(No Model.)
W. SAXE.
SAW SETTING GAGE.
No. 489,039. Patented Jan. 3, 1893.
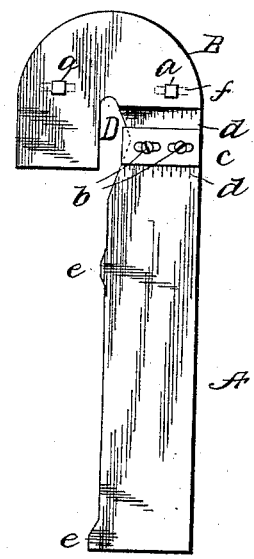
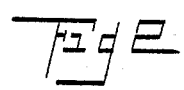
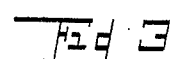
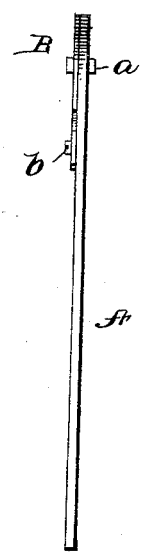
Witnesses
A. S. Bishop
R. W. Bishop
Inventor
William Saxe
by Sheldon A. Wood.
Attorney

UNITED STATES PATENT OFFICE.

WILLIAM SAXE, OF PORT HURON, MICHIGAN.

SAW-SETTING GAGE.

SPECIFICATION forming part of Letters Patent No. 489,039, dated January 3, 1893.

Application filed August 29, 1892. Serial No. 444,496. (No model.)

*To all whom it may concern:*

Be it known that I, WILLIAM SAXE, a citizen of the United States, residing in the township of Port Huron, in the county of St. Clair and State of Michigan, have invented certain new and useful Improvements in Saw-Gages; and I do hereby declare the following to be a full, clear, and exact description of the invention, such as will enable others skilled in the art to which it appertains to make and use the same.

My invention relates to saw gages for use upon circular saws for indicating and measuring the amount of "set" or angle of the saw teeth, in which the parts regulating the amount of set are accurately adjustable; and the object of my invention is to provide a saw gage by which the set on both sides of the saw can be gaged and regulated by an instrument placed upon one side of the saw.

The advantages I claim for my invention are:—First. The set of the saw teeth can be adjusted to any angle and the angle made exactly the same on both sides of the saw.
Second. The set of the teeth upon both sides of the saw can be gaged without moving the gage. As saw gages have been previously constructed it was necessary to use the gage first upon one side of the saw and then upon the other. By my construction the gaging is all done by a gage without moving it to the other side of the saw. Third. My gage is easily adapted to saws of varying thickness; an advantage not secured by any gage heretofore invented. I obtain these objects by the construction illustrated in the drawings in which Figure 1 shows the front of the saw gage. Fig. 2 is a side view, showing the position of the different parts. Fig. 3 is a rear view.

In Fig. 1, A is a plate of metal shaped as indicated in the drawings, and carrying the adjustable plates B and C. B is fastened to A by means of two bolts $a$, sliding in slots $f$, in A as shown by the dotted lines. Set screws may be used if preferred. The adjustable plate C is secured to A by two set screws $b$, penetrating A and passing through slots in C as shown. The scales, $d, d$ are stamped upon the plate A. The gage is placed against the side of the saw, the projections $e, e$ resting upon the saw blade. The saw teeth are received in the slot or opening at D.

Fig. 2 shows the relative thickness and proportion of the parts. Fig. 3 is a rear view showing the nuts upon the bolts, $a, a$ by which the adjustment of the plate B is controlled with reference to the plate A.

In operation the adjustments of the plates B and C are varied according to the thickness of the saw and the set desired. To insure an equal set upon both sides of the saw the scales $d, d$ are used, and by adjusting the parts with reference to these scales, the set is made equal on both sides of the saw blade with absolute accuracy. As both B and C are adjustable, the teeth can all be gaged with reference to their set in either direction without changing the position of the gage from one side of blade to the other.

By the above description it will be seen that I have invented a useful, light and cheap saw gage, simple in operation and easily handled.

Having thus described my invention, what I claim and desire to secure by Letters Patent, is:—

1. A saw gage consisting of a base plate, and two measuring plates adjustably mounted thereon and adapted to bear against opposite sides of the saw.

2. A saw gage consisting of a base plate having offsets to bear against one side of the saw, and measuring plates adjustably secured to the base plate and adapted to bear against the opposite sides of the saw.

In testimony whereof I affix my signature in presence of two witnesses.

WM. SAXE.

Witnesses:
S. A. WOOD,
T. H. MILLS.